(12) United States Patent
Kolbet et al.

(10) Patent No.: US 8,782,467 B2
(45) Date of Patent: Jul. 15, 2014

(54) SYSTEMS AND METHODS FOR CREATING A NEAR OPTIMAL MAINTENANCE PLAN

(75) Inventors: David Michael Kolbet, Scottsdale, AZ (US); Ravindra Patankar, Phoenix, AZ (US); Randy R. Magnuson, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 277 days.

(21) Appl. No.: 13/363,737

(22) Filed: Feb. 1, 2012

(65) Prior Publication Data

US 2013/0198556 A1    Aug. 1, 2013

(51) Int. Cl.
*G06F 11/00* (2006.01)

(52) U.S. Cl.
USPC .......................................................... 714/26

(58) Field of Classification Search
CPC ............................ G06F 11/079; G06F 11/0793
USPC .......................................................... 714/26
See application file for complete search history.

(56) References Cited

U.S. PATENT DOCUMENTS

| | | | |
|---|---|---|---|
| 5,544,308 A * | 8/1996 | Giordano et al. ............... | 714/26 |
| 6,349,393 B1 | 2/2002 | Cox | |
| 6,405,108 B1 | 6/2002 | Patel et al. | |
| 6,662,089 B2 | 12/2003 | Felke et al. | |
| 6,738,748 B2 | 5/2004 | Wetzer | |
| 6,748,304 B2 | 6/2004 | Felke et al. | |
| 6,751,536 B1 | 6/2004 | Kipersztok et al. | |
| 6,826,461 B2 | 11/2004 | Sinex | |
| 6,907,416 B2 | 6/2005 | Tasooji et al. | |
| 7,103,509 B2 | 9/2006 | Shah et al. | |
| 8,234,523 B2 * | 7/2012 | Bharadwaj et al. ............. | 714/26 |
| 2004/0193958 A1 * | 9/2004 | Shah et al. ....................... | 714/37 |
| 2005/0091070 A1 | 4/2005 | Adgaonkar et al. | |
| 2006/0293906 A1 | 12/2006 | Wilson et al. | |
| 2007/0250229 A1 | 10/2007 | Wu | |
| 2008/0021604 A1 | 1/2008 | Bouvier et al. | |
| 2008/0103843 A1 | 5/2008 | Goeppert et al. | |
| 2008/0126171 A1 | 5/2008 | Baldwin et al. | |
| 2008/0172281 A1 | 7/2008 | Probst | |
| 2008/0177613 A1 | 7/2008 | Chan et al. | |
| 2008/0256404 A1 | 10/2008 | Funatsu | |

OTHER PUBLICATIONS

EP Office Action, EP 12 193 502.7-1958 dated Mar. 4, 2013.
EP Search Report, EP 12193502.7-1958 dated Feb. 14, 2013.

* cited by examiner

*Primary Examiner* — Philip Guyton
(74) *Attorney, Agent, or Firm* — Ingrassia Fisher & Lorenz

(57) ABSTRACT

Methods and apparatus are provided for determining a lowest total cost maintenance plan. The method comprises receiving a sequence of maintenance actions in an order of a waiting time for each maintenance action, wherein one of the maintenance actions is likely to repair the failure mode. Each maintenance action has an associated cost equal to a waiting time cost, an execution time cost and a material cost, wherein the waiting time of each maintenance action is the time required to requisition and receive material required to perform the maintenance action. The method also constructs a maintenance plan comprising a primary requisition and a secondary requisition by assigning each of the sequence of maintenance actions to one of the primary and secondary requisition.

17 Claims, 2 Drawing Sheets

SYSTEMS AND METHODS FOR CREATING A NEAR OPTIMAL MAINTENANCE PLAN

STATEMENT REGARDING FEDERALLY SPONSORED RESEARCH OR DEVELOPMENT

This invention was developed with Government support under Contract W56HZV-05-C-0724 awarded by the United States Army. The Government has certain rights in this invention.

TECHNICAL FIELD

The present invention generally relates to the logistics and repair of complex systems. Specifically, it relates to computerized systems in the field of maintenance plan optimization.

BACKGROUND

Man has yet to invent a useful machine or a vehicle that can function throughout its designed useful life without some kind of maintenance or repair being performed. In fact, the lack of reasonable routine maintenance or repair will shorten the useful life of any asset, particularly for complex systems such as aircraft and manufacturing systems.

When a useful asset suffers a casualty in the field, there are a number isolation tests that may be applied to disambiguate and to isolate the failure mode ("FM"), and then to narrow repair options down to a finite group of corrective actions ("CA"). Or conversely, to establish that the group of CAs will not fix the FM. A CA may include either an isolation procedure ("I") or a repair procedure ("R"). Each isolation procedure and each related repair procedure have an estimated execution time cost and a material cost necessary to complete the isolation procedure or the repair procedure.

With complex systems, such as aircraft, a casualty may have a number of potential FM's that could be the underlying cause of the casualty. Each FM may have a particular probability of being the cause of the casualty. As a non-limiting example, an inoperative radio casualty may be caused by three probable FMs: a lack of electric power, a faulty circuit board or maybe a faulty squelch switch. Each FM may have an expected or a historical probability of causing that particular casualty. The probabilities of causing a particular casualty may be determined over time by testing or by historical performance and may be stored in a database for later use.

Further, it will be appreciated by those of ordinary skill in the art that some isolation procedures and repair procedures may be capable of identifying or correcting multiple FMs simultaneously, whether the FMs are related or otherwise. Therefore, each repair procedure and isolation procedure has a probability of correcting or identifying the failure mode. Because one of a set of FMs may have caused a casualty, the set of FMs is referred to as an ambiguity group.

The traditional way of handling ambiguous failures in the field has been to order parts and tools for carrying out the FM isolation tests until the FM is isolated. Once the failure mode is isolated, the parts and tools needed for the repair procedure are then ordered. This would be an optimum solution when all the possible repair actions are expensive (i.e. high parts cost, high execution time, and long wait times) compared to the time and costs of executing all the associated isolation tests. As such, the conventional maintenance philosophy required a field maintenance facility to place at most two requisitions, a primary requisition for all of the isolation tools and a secondary requisition for the specific repair parts and tools as determined by the isolation procedures.

Therefore, in a conventional method, one isolation tool requisition is made for all probable isolation procedures. This means that when parts with a short wait-time are mixed with parts that have a long wait-time in the same order, the longer wait time parts will delay the parts that could be available earlier. There may also be a return penalty for parts that are ordered and not used. As such, the maintenance planning problem and the parts order scheduling problem are mixed and cannot be solved independently as in a traditional setting. For example, if it is assumed that all parts and tools are always on hand, there will be no need for any parts requisition and one could determine the optimal sequence of operations by applying a cost a cost function to expected repair procedures. However, the same sequence of operations may not be optimal if different parts have different wait-times.

However, the conventional way is not always the best in practice. Some repair procedures could be done without first performing an isolation procedure if the repair is inexpensive. Such may be the case even if the probability of success is small. For example, if there is a 1% probability that a failure may be caused by either a $0.25 faulty light bulb or a 99% probability that the failure is caused by a defective $100,000 line replaceable unit ("LRU"), then one would opt to replace the bulb without conducting the associated isolation procedure for the bulb since the probability weighted cost of changing the bulb is deminimus The small probability cost that the bulb is the cause of the FM makes it cost effective not to do the isolation test for the bulb. Regardless of whether or not the casualty was actually fixed by the replacement bulb, a maintenance technician would have already determined whether or not the bulb was the problem and may have repaired the problem at the same time.

As such, finding an optimal solution to the maintenance problem involves knowledge of the future choices. The only way to know all possible future choices is to do an exhaustive search for all possible combinations of corrective actions and parts ordering schedules and apply the results to a cost function. However, the time required for executing an exhaustive search increases exponentially with the number of FMs in the ambiguity group and makes it impractical for field execution. Such a computationally intensive process may take days to provide a solution for a casualty that may involve only a modest handful of probable corrective actions.

A global search process that determines all possible sequences of repair procedures and isolation procedures is a global search system algorithm ("GSA") utilized by Honeywell International, Inc. The GSA determines every combination and permutation of repair procedure and isolation procedure related to a set of probable FMs in an ambiguity group. The GSA then examines each of the possible combinations and permutations of the ambiguity group to determine the aggregate direct costs, wait time costs and probabilities of repair success of each sequence of CAs. The GSA system then computes the total cost for each sequence that does not end with an isolation procedure to determine the lowest cost sequence as the optimal maintenance plan sequence. However, the computing power and time required for such an exhaustive optimization is high.

Alternative sequencing systems may include the system disclosed by Felke in U.S. Pat. No. 6,748,304. Felke uses a two step process whereby only repair procedures are sequenced in their order of probabilistic cost in a first step. After sequencing, a total cost is evaluated for each sequence. In a second step, a single isolation test chosen from a list of all the associated isolation tests is added to the evaluation, in a round robin fashion, until all of the isolation procedures have been worked into a sequence. The lowest cost maintenance plan is then determined amongst the "repair procedure only" sequence and all of those sequences that also included only one isolation procedure. To achieve a near optimal result with the Felke system, further sequencing requires manual intervention to rerun the procedure with those procedures not selected to be the initial repair procedure in the proceeding sequence.

Accordingly, it is desirable to have a maintenance plan system that quickly determines the lowest cost maintenance plan sequence for a given set of failure modes even if such a determination is absolutely sub-optimal but yet close to optimal. In addition, it is desirable to obtain a near to optimal maintenance plan that has high accuracy relative to an optimal solution. The obtained maintenance plan should be no worse than the traditional plan of isolate first then repair. Furthermore, other desirable features and characteristics of the present invention will become apparent from the subsequent detailed description of the invention and the appended claims, taken in conjunction with the accompanying drawings and this background of the invention.

BRIEF SUMMARY

A method for determining a minimum cost maintenance plan for correcting a casualty in a complex machine and a computer readable medium containing instructions for implementing the method is provided. The method includes receiving ambiguity group information comprising a plurality of failure modes associated with the casualty, their related probabilities of resolution and related corrective actions for each failure mode of the plurality, wherein a corrective action is one of a repair procedure and an isolation procedure. The lowest cost corrective action is then determined If the lowest cost corrective action is a repair procedure, then the repair procedure is sequenced into a maintenance plan sequence of corrective actions. If the lowest cost corrective action is an isolation procedure, then it is determined whether any combination and permutation of all unsequenced repair procedures associated with the ambiguity group have a lower cost than the combined cost of the isolation procedure and its associated repair procedure. If one of a combination and permutation of all unsequenced repair procedures has the lower cost, then a first repair procedure is sequenced in the sequence of the one of a combination and permutation into the maintenance plan sequence of corrective actions. If no combination and permutation of all unsequenced repair procedures has the lower cost, then the isolation procedure is sequenced in the maintenance plan sequence of the one of a combination and permutation into the maintenance plan sequence of corrective actions. The process of determining the lowest cost corrective action step is repeated until all failure mode corrective actions have been sequenced into the maintenance plan sequence.

A system is provided for determining a minimum cost maintenance plan for correcting a casualty in a complex machine. The system includes a database. The database contains ambiguity group information comprising a plurality of failure modes associated with the casualty, their related probabilities of resolution and related corrective actions for each failure mode of the plurality, wherein a corrective action is one of a repair procedure and an isolation procedure. The system also comprises a processor in operable communication with the database. The processor executes instructions to receive ambiguity group information from the database and determine the lowest cost corrective action within the ambiguity group. If the lowest cost corrective action is a repair procedure, then the repair procedure is sequenced into a maintenance plan sequence of corrective actions. If the lowest cost corrective action is an isolation procedure, then it is determined if any combination and permutation of all unsequenced repair procedures associated with the ambiguity group have a lower cost than the combined cost of the isolation procedure and its associated repair procedure. If one of a combination and permutation of all unsequenced repair procedures has the lower cost, then a first repair procedure is sequenced in the sequence of the one of a combination and permutation into the maintenance plan sequence of corrective actions. If no combination and permutation of all unsequenced repair procedures has the lower cost, then the isolation procedure is sequenced in the maintenance plan sequence of the one of a combination and permutation into the maintenance plan sequence of corrective actions. The process is repeated step until all failure mode corrective actions have been sequenced into the maintenance plan sequence.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description. Nor is there an intention to be bound by a particular data source.

When using an exhaustive global search such as that performed by the GSA system to create a maintenance plan, a computing device executes a software application resident on a computer readable medium that searches one of more databases for each and every possible FM related to the casualty regardless of probability of occurrence. Each possible failure mode is included in an exhaustive ambiguity group. The software application then compiles a sequenced list of all of the repair and isolation procedures for each of the possible causes.

An alternative method, for producing a near optimal maintenance plan is presented herein below. When a malfunction occurs in a complex machine, the root cause may stem from one of several sources. Some root causes or failure modes ("FM") may be expected and some FMs may not be readily apparent. A group of several potential FMs causing a malfunction may be referred to as an ambiguity group or an ambiguity set.

When an ambiguity set of FMs associated with a particular casualty is retrieve from data storage, the proper corrective action ("CA") for the casualty is probabilistically included in the ambiguity set as a corrective action designated for one of the FMs included in the ambiguity set. However, prior to their execution there is general uncertainty as to which corrective action will remedy the FM and correct the casualty. Each corrective action ($R_i$ or $I_i$) is accompanied with a corrective probability that when applied to its related FM it will fix or isolate the FM.

The system and method described herein reduces costs by eliminating computational overhead required to find an absolutely optimal maintenance plan sequence. This is done by making several assumptions in order to produce an optimal or at least a nearly optimal maintenance plan in a faster and less expensive manner. The subject matter described herein will be disclosed by way of non-limiting examples where an equipment casualty may occur due to a particular failure mode.

Figure 1:
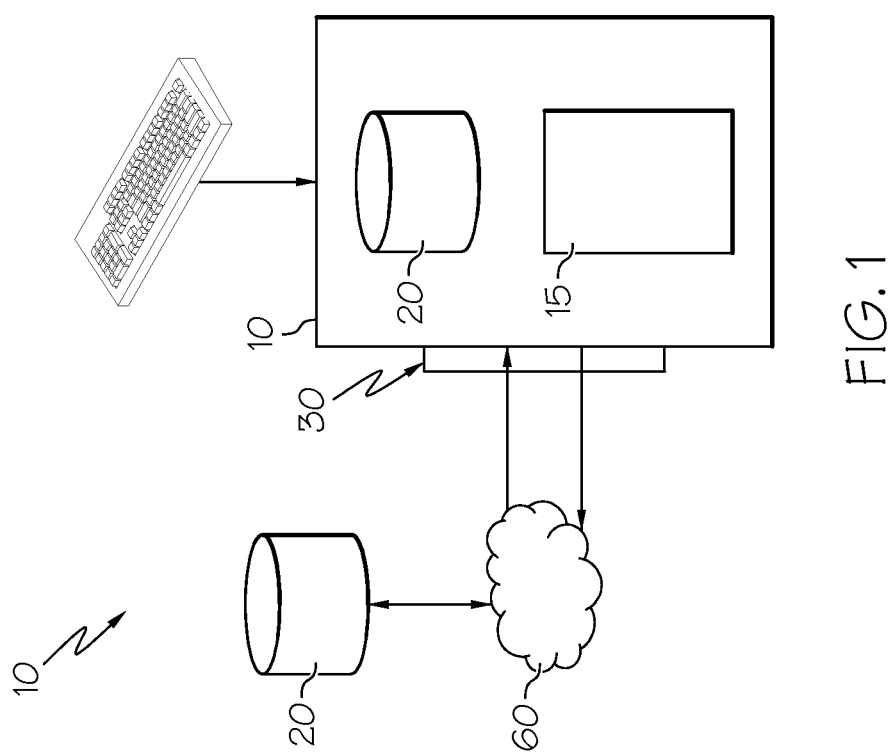
FIG. 1 is a functional block diagram of system described herein.

FIG. 1 is a functional block diagram of a system including the subject matter disclosed herein. In an embodiment, the system 10 may be a stand alone system. The system 10 may be comprised of hardware, software, firmware or a combination thereof. In other embodiments, the system 10 may be a module within a general or a special purpose computer. The system 10 may also be implemented in another device or distributed over or within a network 60 via a wired or wireless computer interface 30.

The system 10 includes a processor 15 in operable communication with the computer interface 30 and a memory device 20. Processor 15 may be any suitable type of processor that currently exists or that may exist in the future. For example, the processor 15 may be any suitable stand alone processor, a programmable logic device, a general purpose processor, a special purpose processor, or a co-processor. The processor 15 and the memory device 20 are each non-limiting examples of a computer readable medium.

The memory device 20 may store thereon a set of instructions that when executed by the processor 15 causes the system 10 to search the memory device 20 for isolation procedures and repair procedures having a probability of identifying and/or correcting a failure mode within the ambiguity group related to the casualty. The memory device 20 may be a single device within the system 10 in some embodiments or in other embodiments the memory device 20 may be a plurality of memory devices in operable communication with each other and with the processor 15. The memory device 20 may be any suitable type of volatile or non-volatile memory devices. Exemplary, non-limiting memory devices may include flash memory, random access memory, read only memory, programmable read only memory, electronic erasable read only memory, programmable logic devices, magnetic disks, optical disks and any suitable memory devices that currently exists or is developed in the future. The foregoing memory devices are also non-limiting examples of computer readable media.

In other embodiments, memory device 20 may be a remote memory device or one or more memory devices distributed on the network 60. Exemplary, non-limiting networks may comprise any suitable network which may include an intranet, internet, and a virtual private network, either wired or wireless.

The memory device 20 may also store thereon FM information. Exemplary FM information may include FM repair actions, FM isolation actions, casualty identification information, FM relationships, probabilities that a repair action would be successful and probabilities that that an isolation act may be successful. Additional recorded information may include estimated completion time, cost of parts, cost of labor, waiting time cost and the like.

As mentioned above, isolation procedures and repair procedures may be capable of identifying or correcting multiple FMs, whether the FMs are related or otherwise. Each repair procedure and isolation procedure has a probability of correcting or identifying the FM. As part of a non-limiting example of the method disclosed herein, this information may be visualized in matrix form as presented in Table 1A:

TABLE 1A

| | | | | | | | |
|---|---|---|---|---|---|---|---|
| Normalized Cause Probability | 80% | 10% | 10% | | NA | NA | NA |
| FM | FM1 | FM2 | FM3 | | FM1 | FM2 | FM3 |
| R1 | 100% | 0% | 50% | I1 | 99% | 75% | 90% |
| R2 | 0% | 99% | 0% | I2 | 50% | 99% | 0% |
| R3 | 0% | 0% | 99% | I3 | 0% | 0% | 99% |

In exemplary Table 1A, there are three failure modes F1, F2 and F3 in the ambiguity group. There are also three repair procedures R1, R2 and R3 and three isolation procedures I1, I2 and I3. Each isolation procedure ($I_i$) is associated with an FM and each repair procedure ($R_i$) is associated with an FM. However, repair procedures and isolation procedures are not necessarily linked or associated together.

Table 1A indicates that R1 has a 100% probability of correcting FM1, a 0% probability of correcting FM2 and a 50% probability of correcting FM3. Repair procedures R2 and R3 have 99% probability of correcting FM2 and FM3, respectively. Similarly, isolation procedure one (I1) has a 99% probability of correctly identifying FM1 as the cause of the casualty, a 75% probability of identifying FM2 as the cause and a 90% probability of identifying FM3 as the cause. Isolation procedure two (I2) has a 50% probability of identifying FM1 as the cause of the casualty, a 99% probability of identifying FM2 and a 0% probability of identifying FM3. Isolation procedure three (I2) has a 99% chance of identifying FM3.

As may be seen in exemplary Table 1A, a repair procedure may have a 100% certainty of resolving a particular FM, particularly if the repair procedure was designed to correct that specific casualty. The same may be said of a particular isolation procedure. Some repair and isolation procedures may, coincidentally or by design, have the ability to correct a plurality of FMs but at varying probabilities. For example, replacing a battery may cure both a non-functioning relay for an electric motor and cure the non-functioning electric motor itself. As such two FMs may be cured/identified by one repair/isolation procedure.

However, even though the probability of a repair procedure correcting a FM may be 100%, the actual probability stored in the memory device 20 for use in the methods and systems disclosed herein, may be less than 100% due to the possibility of a faulty repair part or a faulty piece of test equipment being used in the isolation procedure or repair. The ramifications of having a successful correction probability slightly less than 100% will be disclosed more fully below.

In some embodiments, the predetermined probability that a particular failure mode caused a casualty may be such that the sum of the probabilities of all of the FMs do not total 100%. However, a simplifying assumption is made that the cause of the casualty is always included in the ambiguity group of FMs and, as such, the cause probabilities in Table 1A may be normalized to total 100%. In effect, the ambiguity group is assumed to be all inclusive such that the FM actually causing the casualty is indeed in the ambiguity group. In actuality, this may or may not be the case.

Other simplifying assumptions are also made. As a simplifying assumption, it may be assumed that only a single failure mode within an ambiguity group is the actual cause of the casualty. It may also be assumed in some embodiments that all isolation tests are perfect. In other words, if the FM being tested is the underlying cause of the casualty, the isolation test will always detect the FM.

Another assumption that may be made is that one isolation test or one repair can isolate multiple FMs where there is an overlap of FM applicability between isolation procedures. For example, isolation procedure I1 may address FM1 and FM2. Isolation procedure I2 may address FM5 and FM2. There would then be an overlap between I1 and I2 because both I1 and I2 can isolate FM2. However, one of ordinary skill in the art would appreciate that both I1 and I2 may still be necessary because they each address an FM that the other does not. Conversely, it may be assumed in some embodiments that one repair procedure can correct multiple FMs without an overlap of applicability to the same FM as between repair procedures.

An imperfect Isolation or Repair action is one which may be effective for certain FMs with sometimes but not every time, meaning effective with a probability instead of absolute effectiveness. For example an imperfect repair is effective on an FM with probability 0.6 then carrying out that repair once will fix the FM with probability 0.6 and continue to have the same FM with probability (1−0.6). If we continue to have the same FM we will have to carry out the same repair again and the total probability with which the problem will be fixed by carrying out the same repair twice will be 0.6+(1−0.6)×0.6. Thus, more often the same imperfect repair is carried out lesser is the probability that the same FM will continue to be present. If it were a perfect repair, it would repair the FM with a probability of 100% the very first time and the FM would no longer be present. Perfection cannot be achieved with imperfect actions unless one can execute the imperfect action infinite times. Therefore, while dealing with imperfect actions, one could reduce the FM probabilities sufficiently by repeating the actions as needed but not be able to make them equal to zero. Here, addressing an FM sufficiently would mean that the probability of that FM is reduced sufficiently so that it is below a threshold and the FM could be considered "dealt with." This is also reflected at process 133 where all FMs might already be addressed but they might not be addressed sufficiently forcing the flowchart back to block 104.

The system disclosed herein may be described as "conducting cost ranking using iterative scaling of probabilities" (or "CRISP"). The CRISP method sequences a specific number of defined corrective actions received from memory relevant to an ambiguity group. The defined corrective actions may in some embodiments be sequenced in order of isolation and repair actions as they are received from memory device 20, sequenced by the amount of information the isolation or repair action would uncover at a particular position in the sequence, and/or sequenced by the probability that the FM can be resolved with a particular isolation or repair action in that particular position in the sequence. However, one of ordinary skill in the art will recognize that the corrective actions may be sequenced using a different index or methodology.

The amount of information uncovered by a repair or isolation action may be measured by the change in FM probability upon its execution. Although beyond the scope of this disclosure, information content extracted from changes within an ambiguity group can be derived using calculations based on Shannon's Entropy Equation $$H(x) = -\Sigma P_i \log_2 P_i$$

Where, $P_i$ is the probability of a given occurrence.

Referring to Table 1A, if repair procedure R1 is executed but the repair does not cure FM1, then the probability of FM1 being the cause of the casualty becomes 0%. This is so because R1 has a 100% probability of fixing FM1 but did not. As such FM1 is not the problem.

Repair procedure R1 also has a 50% probability of fixing FM3. Therefore the probability that FM3 is still the cause of the casualty after R1 has been completed drops from 10% to 5% [(100%−50%)×10%]. The new probabilities For FM1, FM2 and FM3 are now 0%, 10% and 5%. Because the new FM1 resolution probabilities no longer equal 100%, the resolution probabilities are renormalized. The new resolution probabilities are 0, 66.66% and 33.33% (See Table 1B, below). In other words, executing repair procedure R1 gives you an 80% chance of resolving the casualty and a 15% chance of being in the situation illustrated in Table 1B. This is so because there would now be a 100% chance of resolving FM1 (80% chance of being the cause) if it is the cause of the casualty and a 50% chance of resolving FM3 (10% chance of being the cause) if it is the cause of the casualty. Therefore, the probability of procedure R1 resolving the ambiguity group (i.e. the casualty) is 100%×80%+50%×10%=85%.

Each successive repair or isolation action is selected for the maintenance plan sequence by choosing the action which has the least cost of obtaining information about the casualty. In addition, in evaluating the cost of an isolation procedure, the cost of the corresponding repair procedure after being isolated and the cost of those repairs assuming that the related isolation action were not executed are also considered.

In other exemplary embodiments, a failure mode may have four likely causes (X, Y, Z and C) that are included in the ambiguity group shown in Table 2. In the context of the system 10, an ambiguity group is a set of FMs that can cause a casualty. Any of the FMs may have caused the failure and each FM will have a probability of being the actual cause. In some ambiguity groups, it is possible for the actual cause not to be included in a related group, but may be appended to an ambiguity group on an ad hoc or a predefined basis.

Whether or not the FMs of the ambiguity group cover every possible cause such that their summed probabilities total 100%, the probabilities of each FM making up the ambiguity group are normalized such that the sum of the probabilities in the ambiguity group will always total 100%. It will be appreciated by those skilled in the art that some failure modes that are improbable may not be included in the ambiguity group for the sake of efficiency and cost reduction.

TABLE 2

| Failure Mode | X | Y | Z | C |
|---|---|---|---|---|
| Probability | 10% | 33% | 33% | 24% |
| Isolation Procedure | $I_x$ | $I_y$ | $I_z$ | $I_c$ |
| Repair Procedure | $R_x$ | $R_y$ | $R_z$ | $R_c$ |

As an output, the system 10 may produce a prioritized list of repair procedures intermingled with isolation procedures in order of ascending cost from the ambiguity group. For example the computer based system 10 may generate the prioritized sequence: $R_x, I_x, I_y, I_z, I_c, R_c, R_y, R_z$. where parts and material required may be assumed to be on hand.

This particular example illustrates that, based on the cost, repair X ($R_x$) should be executed first followed by isolation and repair procedures $I_x, I_y, I_z, I_c, R_c, R_y$, and $R_z$ Executing the actions in the order provided by the computerized system 10 may minimize the overall wait time where all parts and tools are ordered simultaneously. If the performance of $R_x$ was unsuccessful, isolation procedures $I_y, I_z$ and $I_c$ would then be performed in order along with repair $R_c, R_y$, or $R_x$ as identified by isolation action $I_y, I_z$ and $I_c$. The computerized diagnostics system 50 may also determine the overall cost of ordering and performing the entire list of corrective actions.

It will be appreciated by one of ordinary skill in the art that because the performance of repair $R_x$ is suggested to be accomplished before the isolation procedure $I_x$ for FM X, a successful repair $R_x$ may nullify any need for conducting $I_x$ and any other repair and/or isolation procedures subsequent to completing $R_x$. If $R_x$ was unsuccessful, the need to conduct $I_x$ may still be obviated because the associate repair $R_x$ failed to clear the casualty so the technician already knows that cause X is not the problem. However, in some embodiments where the assumption of non-overlapping FMs is removed $I_x$ may isolate other FMs other than $FM_x$ and would be executed even after repair $R_x$ has been executed.

Figure 2:
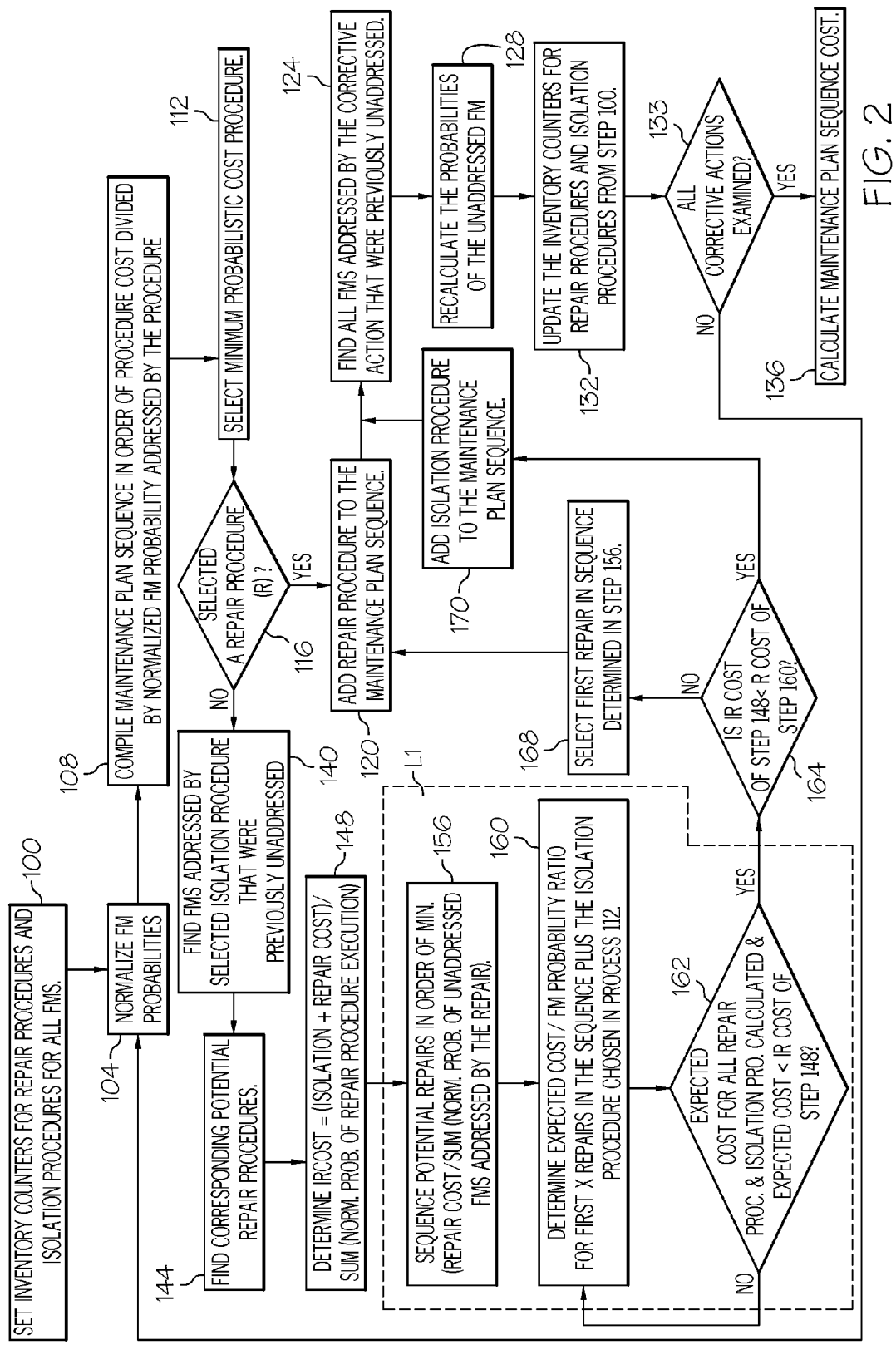
FIG. 2 is a simplified flow chart illustrating the exemplary embodiments disclosed herein for creating a method for developing a maintenance plan.

In another exemplary embodiment, the methodology implemented by, the system 10 is disclosed in further detail in regard to the example FIG. 2, referring to the data in Table 3. Although this simplified example is presented for the sake of brevity and clarity, the method below is applicable to more complex cases. It will be appreciated by those of ordinary skill in the art that the assumptions and the processes disclosed below may be altered without straying from the intended scope of this disclosure. Different failure mode assumptions may be made and logical processes may be combined, split apart, rearranged and substituted with similar processes and still fall within the intended scope of the subject matter disclosed herein.

Table 3 below is a three FM example where the cost function of the overall maintenance sequence will be assumed to equal the dollar cost of tools and parts plus the time value costs to execute each repair procedure and isolation procedure.

TABLE 3

| Failure Mode | 1 | 2 | 3 |
| --- | --- | --- | --- |
| Probability of Resolution | 80% | 10% | 10% |
| Isolation Cost (IC) | $20 | $ 5 | $ 15 |
| Adjusted Isolation Cost (IC) | $25 | $ 50 | $150 |
| Repair Cost (RC) | $10 | $ 100 | $ 50 |
| Adjusted Repair Cost (RC) | $12.5 | $1000 | $500 |

Having received and/or retrieved the pertinent casualty data (See Table 1A), the processor 15 determines the likely failure modes (n=3) comprising the ambiguity group, produces a list of six (2n) repair and isolation actions, determines the cost for each repair action (R1-R3) and each isolation action (I1-I3) at process 100 using the probability of resolution for each FM such as that provided in Table 1A, above. If the probabilities of resolution do not sum to 100%, then the probabilities of resolution are adjusted either upwards or downwards, as may be known in the art, to normalize the probabilities of resolution at process 104. In Table 3, the probabilities of resolution coincidently total 100%. Therefore, normalization is not necessary in this example.

At process 108, the probability adjusted costs of each of the six (2n) exemplary repair procedures and isolation procedures is calculated. For example, the cost of repair action R1 would be adjusted by dividing the actual cost of the repair ($10) by the probability that the repair will resolve the FM (80%). The probability adjusted cost is $12.5 ($10/0.8). The probability adjusted costs for each repair procedure and each isolation procedure is also presented in Table 3. At process 112, the repair procedure or the isolation procedure with the lowest probability adjusted cost is selected. In this example, the lowest probability adjusted cost procedure is R1 which is $12.5.

At decision point 116, a determination is made at to whether the procedure picked is a repair procedure or an isolation procedure. In this example, repair procedure R1 was the lowest cost procedure determined at process 108. As such, R1 is added to the repair plan sequence in procedure 120.

At process 124, processor 15 determines all of the FMs that are resolved by performing repair procedure R1. Referring to Table 1A above, R1 indicates a 100% probability of resolving FM1 and a 50% chance of resolving FM3. Therefore, by executing repair procedure R1, FM1 will be resolves and FM3 will likely be resolved at least partially. Since this is the first corrective action, all FMs addressed by the Repair procedure R1 (FM1 and FM3) and were previously unaddressed. As such, the effectiveness of I1, I3 and R3 may be diminished in Table 1B by reducing FM1 And FM3 probabilities in process 128. As discussed above, the probability of FM1 being the underlying cause may be reduced to zero and the probability of FM3 being the underlying cause may be reduced to 5%.

Conversely, in other embodiments, the corrective action probabilities within the table may be dropped to number that is very small but not zero. This may be done to account for the possibility that R1 was conducted with a defective part, material or test equipment. By maintaining the resolution probability for R1 and R3 to a small non-zero probability, it keeps the procedures in the mix of procedures but makes the probability adjusted cost of those procedures very high such that those procedures addressed by R1 will be the last procedures chosen. The new probabilities used in some embodiments are reflected in Table 1B, below:

TABLE 1B

| | | | | | | | |
| --- | --- | --- | --- | --- | --- | --- | --- |
| Normalized Cause Probability | 0% | 66.66% | 33.33% | | NA | NA | NA |
| FM | FM1 | FM2 | FM3 | | FM1 | FM2 | FM3 |
| R1 | 100% | 0% | 50% | I1 | 99% | 75% | 90% |
| R2 | 0% | 99% | 0% | I2 | 50% | 99% | 0% |
| R3 | 0% | 0% | 99% | I3 | 0% | 0% | 99% |

At process 132 the list of repair actions is decremented by one as R1 has been added to the sequence and can be checked off the list created in process 100. Isolation procedures I1-I3 remain on the list. At this point since no isolation procedures have been added to the sequence. At process 133, the method returns to process 104 because all corrective actions have not been examined At process 104, the remaining corrective actions R2, R3, I2 and I3 are renormalized such that their probabilities of resolution total 100%. Those of ordinary skill in the art will recognize that in some embodiments, because R1 will be executed first, isolation procedure I1 may be dropped from the list of remaining corrective actions because performing I1 would no longer add to the information concerning the casualty. Whether or not R1 resolved the casualty, executing I1 would be merely redundant.

At process 108, the new probabilistic cost of R2, R3, I2 and I3 are calculated. In embodiments where FM1 is completely removed from the ambiguity group because repair procedure R1 has resolved the issue one way or the other, then the resolution probabilities for FM2 and FM3 would then be 50% and 50%, respectively. If FM1 stays in the ambiguity group, then the resolution probabilities would remain 80%, 10% and 10%, respectively. However, because the probabilistic cost of corrective actions with low remaining probabilities, corrective actions for FM1 will appear at the end of the maintenance plan sequence.

At procedure 112, the corrective action with the lowest probabilistic cost is selected. In this example, that would be I2 with a probabilistic cost of $50. At decision point 116 it is determined that an isolation procedure has been selected as the lowest cost corrective action.

At process 140, the processor 15 determines which unaddressed FMs that are unaddressed (i.e. FM2 and FM3) that will be addressed by isolation action I2. In this example that would result in FM2. At process 140, the related repair procedure (R2) is determined for the selected isolation procedure (I2).

At process 148, the sum of the isolation cost and the repair cost associated with I2 and R2 is calculated by dividing the combined cost by the sum of the normalized probabilities for executing both the repair procedure and the Isolation procedure. In this case, with a single isolation/repair that cost would be $80, where, Cost=(IC2+P3×RC3)/P3=($15+0.5×$50)/0.5.

The general formula is $$\text{Cost} = \frac{(IC2 + (P3 \times RC3) + (P4 \times RC4) + \ldots + (P_{i+1} \times RC_{i+1})}{P1 + P2 + P3 \ldots + Pi}$$

At Loop 1 (L1), the method enters a subroutine where the cost of executing the repair determined in process 148 is compared to the probabilistic costs of all possible combinations of the remaining repair procedures and isolation procedures beginning with all possible combinations of repair costs only and then adding in isolation procedures until the costs of all combinations and permutations of repair procedures and isolation procedures have been calculated. In the present example cost of executing repair procedure R2 is RC2 divided by P2 or ($100/0.5=$200).

At process 156, the remaining repair procedures are sequenced in order of probabilistic cost where the probabilistic cost of each repair procedure equals its actual cost divided by the sum of the normalized probabilities of unaddressed FMs that will be addressed by the repair procedure.

At process 160, the probability cost ratio is calculated for the sequence compiled from process 156 and adding the cost of the isolation procedure chosen at decision point 116. The probability cost ratio for each sequence is then compared to the probabilistic cost if the repair (RC2/P2). At process 162, as long as the cost of repair (RC2/P2) is less than the probability cost ratio calculated at process 160, the loop L1 continues.

Each time a repair (RCi/Pi) is less than the probability cost ratio calculated at process 160 at the end of an iteration of loop L1, the first repair in the latest sequence is determined at process 168 and is appended to the final repair plan being compiled at process 120. The method then continues to process 124 and subsequent steps as described above as if a repair procedure was selected at decision point 116.

However, if the cost of repair (RC2/P2) determined at process 156 is greater than probability cost ratio of the sequence calculated at process 160 as determined at decision point 164, then the loop L1 stops and the isolation procedure selected at decision point 116 is appended to the final repair plan being compiled at process 170. The method then continues to process 124 and follows the subsequent steps as described above as if a repair procedure was selected at decision point 116.

When all of the combinations and permutations have been exhausted such that all of the repair procedures and isolation procedures relating to all of the FMs have been sequenced as the maintenance plan at process 133, the method stops and the expected cost of the final maintenance plan sequence is calculated at process 136.

In other embodiments, where one assumes that the repairs are less than 100% successful, such that there is a small probability that there is a bad repair part used, the process may continue. This is so because those corrective actions with small percentages would not have dropped out of the sequencing method but would have been suppressed by their very small corrective probabilities in favor of those corrective actions remaining unsequenced with relatively large corrective probabilities. In these embodiments the method could loop continually. Inn these cases a cut-off or a minimum corrective probability could be used to bring the method to a finite close.

FIG. 3 is a graph of 2400 simulation test results comparing the CRISP method disclosed herein to both an optimal global search methodology and to a naïve/worst maintenance plan sequence. As may be seen in FIG. 3, the CRISP results were as cost effective as the results for the global search method or slightly higher due to the simplifying assumptions and calculations of the CRISP methodology. However, the CRISP results are significantly better than a naïve/worst plan result thereby demonstrating the efficacy of the CRISP methodology.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for determining a minimum cost maintenance plan for correcting a casualty in a complex machine, comprising:

receiving ambiguity group information by a processor comprising a plurality of failure modes of an ambiguity group associated with the casualty, their related probabilities of resolution and related corrective actions for each failure mode of the plurality, wherein a corrective action is one of a repair procedure and an isolation procedure;

determining the lowest cost corrective action within the ambiguity group, when the lowest cost corrective action is a repair procedure, then sequencing the repair procedure into a maintenance plan sequence of corrective actions;

when the lowest cost corrective action is an isolation procedure, then:

determining if any combination and permutation of all unsequenced repair procedures associated with the ambiguity group have a lower cost than a combined cost of the isolation procedure and its associated repair procedure, when one of a combination and permutation of all unsequenced repair procedures has the lower cost, then sequencing a first repair procedure in the sequence of the one of a combination and permutation into the maintenance plan sequence of corrective actions, when no combination and permutation of all unsequenced repair procedures has the lower cost, then sequencing the isolation procedure in the maintenance plan sequence of the one of a combination and permutation into the maintenance plan sequence of corrective actions; and repeating the determining the lowest cost corrective action step until all failure mode corrective actions have been sequenced into the maintenance plan sequence.

2. The method of claim 1, wherein the failure mode related probabilities are normalized probabilities.

3. The method of claim 2, wherein the lowest cost corrective action is determined after adjusting a cost of the corrective action by dividing the cost of the corrective action by the normalized related probability of its associated failure mode.

4. The method of claim 1, wherein the unsequenced repair procedures are associated with failure modes that are addressed by the isolation procedure but which have been previously unaddressed.

5. The method of claim 1, further comprising determining failure modes addressed by the last corrective action sequenced that have been previously unaddressed.

6. The method of claim 5, further comprising recalculating the probabilities of resolution related to failure modes that are yet unaddressed.

7. The method of claim 1 wherein a corrective action may resolve multiple failure modes.

8. The method of claim 6 wherein after being sequenced into the maintenance plan sequence, the corrective action remains related to an unaddressed failure mode but with a new probability of resolution that is equal to 100% minus the original probability of resolution of the associated failure mode.

9. A non-transitory computer readable medium containing instruction recorded thereon that when executed by a computing device carry out acts for determining a minimum cost maintenance plan for correcting a casualty in a complex machine, comprising:

receive ambiguity group information comprising a plurality of failure modes of an ambiguity group associated with the casualty, their related probabilities of resolution and related corrective actions for each failure mode of the plurality, wherein a corrective action is one of a repair procedure and an isolation procedure;

determine the lowest cost corrective action within the ambiguity group;

when the lowest cost corrective action is a repair procedure, then sequence the repair procedure into a maintenance plan sequence of corrective actions;

when the lowest cost corrective action is an isolation procedure, then:

determine if any combination and permutation of all unsequenced repair procedures associated with the ambiguity group have a lower cost than the combined cost of the isolation procedure and its associated repair procedure, when one of a combination and permutation of all unsequenced repair procedures has the lower cost, then sequence a first repair procedure in the sequence of the one of a combination and permutation into the maintenance plan sequence of corrective actions, when no combination and permutation of all unsequenced repair procedures has the lower cost, then sequence the isolation procedure in the maintenance plan sequence of the one of a combination and permutation into the maintenance plan sequence of corrective actions; and repeat the determining step until all failure mode corrective actions have been sequenced into the maintenance plan sequence.

10. The computer readable medium of claim 9, wherein the failure mode related probabilities are normalized probabilities.

11. The computer readable medium of claim 10, wherein the lowest cost corrective action is determined after adjusting the cost of the corrective action by dividing the cost of the corrective action by the normalized related probability of its associated failure mode.

12. The computer readable medium of claim 9, wherein the unsequenced repair procedures are associated with failure modes that are addressed by the isolation procedure but which have been previously unaddressed.

13. The computer readable medium of claim 9, further comprising instructions to determine failure modes addressed by the last corrective action sequenced that have been previously unaddressed.

14. The computer readable medium of claim 13, further comprising instructions to recalculate the probabilities of resolution related to failure modes that are yet unaddressed.

15. The computer readable medium of claim 9 wherein a corrective action may resolve multiple failure modes.

16. The computer readable medium of claim 14 wherein after being sequenced into the maintenance plan sequence, the corrective action remains related to an unaddressed failure mode but with a new probability of resolution that is equal to 100% minus the original probability of resolution of the associated failure mode.

17. A system for determining a minimum cost maintenance plan for correcting a casualty in a complex machine, comprising:

a database containing ambiguity group information comprising a plurality of failure modes associated with the casualty, their related probabilities of resolution and related corrective actions for each failure mode of the plurality, wherein a corrective action is one of a repair procedure and an isolation procedure; and a processor in operable communication with the database, the processor executing instructions to:

receive ambiguity group information from the database;

determine the lowest cost corrective action within the ambiguity group;

when the lowest cost corrective action is a repair procedure, then sequence the repair procedure into a maintenance plan sequence of corrective actions;

when the lowest cost corrective action is an isolation procedure, then:

determine if any combination and permutation of all unsequenced repair procedures associated with the ambiguity group have a lower cost than the combined cost of the isolation procedure and its associated repair procedure, when one of a combination and permutation of all unsequenced repair procedures has the lower cost, then sequence a first repair procedure in the sequence of the one of a combination and permutation into the maintenance plan sequence of corrective actions, when no combination and permutation of all unsequenced repair procedures has the lower cost, then sequence the isolation procedure in the maintenance plan sequence of the one of a combination and permutation into the maintenance plan sequence of corrective actions; and repeat the determine step until all failure mode corrective actions have been sequenced into the maintenance plan sequence.

\* \* \* \* \*